United States Patent
Kaz et al.

(10) Patent No.: US 7,147,744 B2
(45) Date of Patent: Dec. 12, 2006

(54) PROCESS FOR PRODUCTION OF MULTI-LAYER ELECTRODE OR ELECTRODE ASSEMBLY AND GASEOUS DIFFUSION ELECTRODE

(75) Inventors: Till Kaz, Stuttgart (DE); Norbert Wagner, Sindelfingen (DE)

(73) Assignee: Deutsches Zentrum fuer Luft-und Raumfahrt e.V., Cologne (DE)

( * ) Notice: Subject to any disclaimer, the term of this patent is extended or adjusted under 35 U.S.C. 154(b) by 585 days.

(21) Appl. No.: 10/087,448

(22) Filed: Mar. 1, 2002

(65) Prior Publication Data

US 2002/0150812 A1 Oct. 17, 2002

(30) Foreign Application Priority Data

Mar. 7, 2001 (DE) .................. 101 12 232

(51) Int. Cl.
*B32B 37/24* (2006.01)
*B32B 38/00* (2006.01)
*H01M 4/04* (2006.01)
*H01M 4/86* (2006.01)

(52) U.S. Cl. .............. 156/279; 156/279; 427/115; 427/202; 427/205; 429/41; 429/42; 429/44

(58) Field of Classification Search ................ 156/276, 156/279, 280, 324; 427/115, 202, 205; 429/27, 429/28, 29, 30, 40, 41, 42, 44
See application file for complete search history.

(56) References Cited

U.S. PATENT DOCUMENTS

| 3,629,007 A * | 12/1971 | Kilduff ............ 427/122 |
| 3,740,270 A * | 6/1973 | Bilhorn ............ 429/152 |
| 3,751,301 A * | 8/1973 | Kilduff ............ 429/217 |
| 3,859,134 A * | 1/1975 | Shirodker .......... 429/211 |
| 4,185,131 A * | 1/1980 | Goller et al. ....... 427/113 |
| 4,336,217 A | 6/1982 | Sauer |
| 4,603,060 A * | 7/1986 | Mitsuda et al. ..... 427/115 |
| 4,849,253 A * | 7/1989 | Maricle et al. ..... 427/115 |
| 4,992,126 A * | 2/1991 | Door ................. 156/182 |
| 5,010,050 A | 4/1991 | Wüllenweber et al. |
| 5,120,665 A * | 6/1992 | Tsukagoshi et al. ... 156/64 |
| 5,531,955 A * | 7/1996 | Sugikawa ............. 419/2 |
| 5,761,793 A | 6/1998 | Bevers et al. |
| 5,935,643 A | 8/1999 | Song et al. |
| 6,019,144 A | 2/2000 | Moulton |
| 6,197,365 B1 * | 3/2001 | Bachinger et al. ... 427/115 |
| 6,277,513 B1 * | 8/2001 | Swathirajan et al. ... 429/44 |
| 6,627,035 B1 * | 9/2003 | Fan et al. .......... 156/308.2 |
| 6,758,868 B1 * | 7/2004 | Munshi ............. 29/25.03 |
| 2002/0034675 A1 * | 3/2002 | Starz et al. .......... 429/42 |
| 2002/0192533 A1 * | 12/2002 | Gebhardt et al. ..... 429/40 |

FOREIGN PATENT DOCUMENTS

| DE | 29 41 774 | 4/1981 |
| DE | 195 09 749 | 10/1996 |
| DE | 195 48 422 | 9/1997 |
| DE | 197 57 492 | 7/1999 |

(Continued)

*Primary Examiner*—Melvin Mayes
(74) *Attorney, Agent, or Firm*—Lipsitz & McAllister, LLC

(57) ABSTRACT

In order to make a process available for the production of a multi-layer electrode or electrode assembly, with which an electrode or electrode assembly optimized for the respective use may be produced in a simple and, in particular, inexpensive manner it is suggested that a first layer be rolled onto a carrier and at least one additional function layer be produced by spraying on a powder.

11 Claims, 2 Drawing Sheets

FOREIGN PATENT DOCUMENTS

Figure 1:
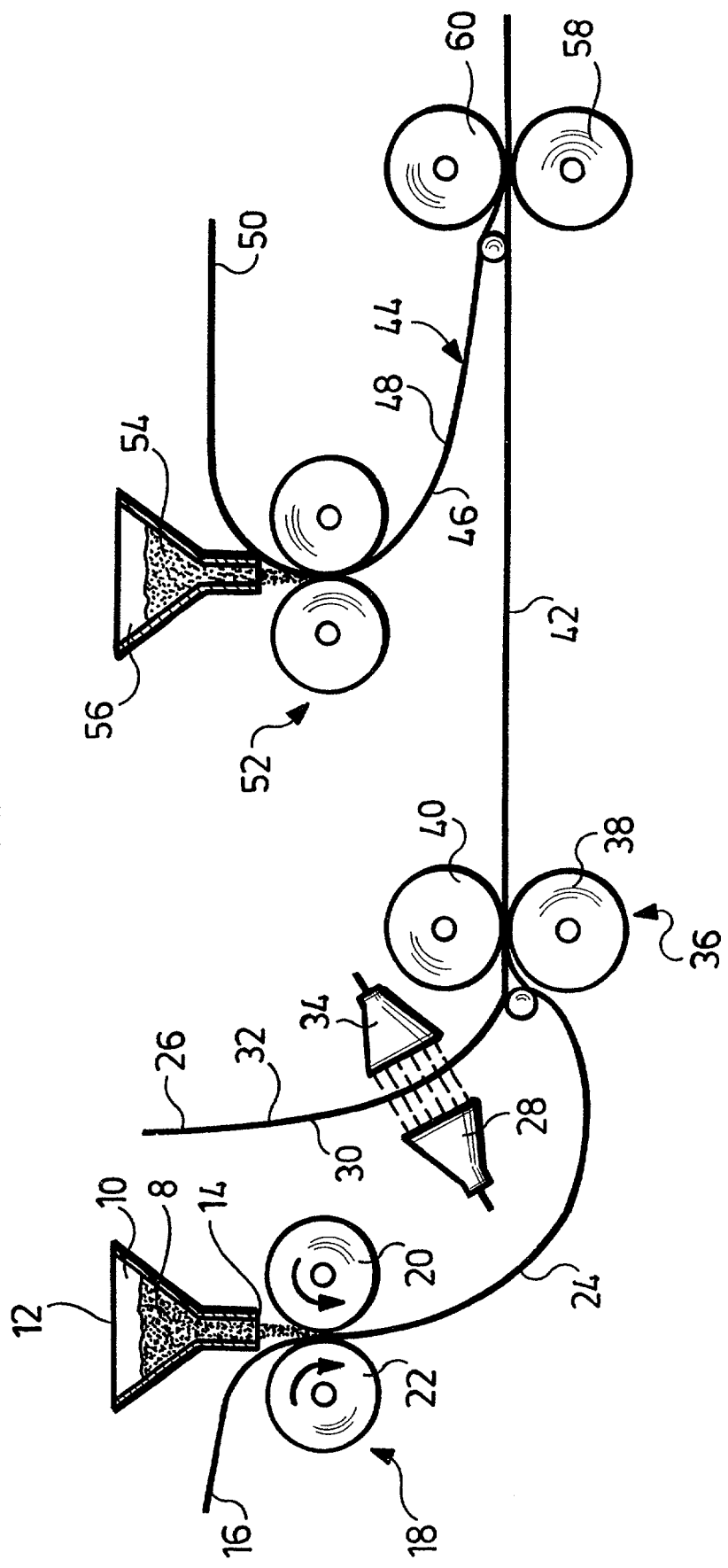

| | | |
|---|---|---|
| EP | 0 144 002 | 6/1985 |
| EP | 0 339 717 | 11/1989 |
| EP | 1 055 748 | 11/2000 |
| GB | 1049428 | 11/1966 |
| JP | 58-166642 * | 1/1983 |
| SU | 1694411 * | 11/1991 |
| WO | 99/64641 | 12/1999 |

* cited by examiner

PROCESS FOR PRODUCTION OF MULTI-LAYER ELECTRODE OR ELECTRODE ASSEMBLY AND GASEOUS DIFFUSION ELECTRODE

The invention relates to a process for the production of a multi-layer electrode or electrode assembly.

Furthermore, the invention relates to an electrode which has a catalytically active reaction layer.

Multi-layer electrodes or electrode assemblies are used, for example, in fuel cells or for the chlorine-alkali electrolysis. A further example of their application is the use as an oxygen-consuming electrode for the HCl electrolysis.

The object underlying the invention is to provide a process, with which an electrode or electrode assembly which is optimized for the respective use can be produced in a simple and, in particular, inexpensive manner.

This object is accomplished in accordance with the invention, in the process cited at the outset, in that a first layer is rolled onto a carrier and at least one additional function layer is produced by spraying on a powder.

As a result of the fact that, in accordance with the invention, rolling process and spraying process are combined, the use of semifinished products during the production of a multi-layer electrode or electrode assembly can be dispensed with. The structure corresponding to a semifinished product is itself produced in accordance with the invention.

As a result of the combination of rolling and spraying, the advantages of these respective processes may be utilized and the individual layers which have been rolled or sprayed on separately from one another may then be combined.

It is known, for example, from the state of the art to form a carrier structure by means of a carbon fabric or a carbon fleece. Materials of this type are, however, relatively expensive. In accordance with the invention, a carrier structure may be formed, for example, by rolling carbon particles onto a carrier which is considerably less expensive than the use of a carbon fabric or carbon fleece. The carrier may, in particular, be a carrier tape or a carrier mesh.

The properties of the multi-layer electrode or electrode assembly may be selectively adjusted as a result of a function layer, such as, for example, a barrier layer and/or a reaction layer, being sprayed on, wherein an optimization of properties can be carried out with respect to the different layers since different production processes are provided for separate layers.

It is favorable when the powder for forming the additional function layer is sprayed on dry. Such dry spraying processes may be carried out in a simple manner with the aid of one or more spray nozzles.

In order to bring about a thermal fixing of a layer in addition to a mechanical fixing, it is favorable when a roller application of a layer is brought about by means of one or more heated rollers. As a result, a spray layer, onto which an additional layer is rolled, can also be fixed thermally.

A carrier structure may be formed in an inexpensive manner or rather a carrier used which is produced from high-grade steel, gold-plated high-grade steel, from silver-plated nickel, in particular, when the electrode produced is used with alkaline media or from titanium. Since these are metallic materials, they can, on the one hand, be processed in a simple manner, for example, be unwound from a roll of tape and, on the other hand, are electrically conductive. The carrier can also be produced from a non-conductive material which is or has been coated with a conductive material, such as carbon.

In a variation of one embodiment, a sprayed-on function layer is a reaction layer. For example, a carrier structure is formed by rolling a carbon powder onto a carrier mesh and, subsequently, a reaction layer is sprayed onto this carrier structure. The production of the carrier structure may then be carried out in an inexpensive manner, wherein the reaction layer can be sprayed on thin. Since the reaction layer presupposes a generally expensive catalyst material, the production may likewise be carried out inexpensively by means of the thin spraying on. The powder material for forming the reaction layer by spraying on is, in particular, a catalyst carrier material on a carbon basis, such as platinum or other precious metals. The carbon carrier represents an electrically conductive material which can be processed inexpensively and in a simple manner.

In a further, alternative or additional variation of one embodiment, a sprayed-on function layer is a barrier layer. When using electrodes or electrode assemblies in electrolytic cells with liquid electrolytes, the problem of an electrolyte breakout can result when a high hydrostatic pressure prevails in the electrolytic cells. Such an electrolyte breakout can be prevented by means of the barrier layer, wherein the barrier layer may be of a thin formation due to the spraying on.

In order to ensure the barrier effect it is advantageous when a mixture consisting of carbon and a hydrophobing material is used for forming a barrier layer, wherein the hydrophobing material increases the barrier effect with respect to the electrolyte breakout. On the other hand, the electrochemical properties of a corresponding electrode are not fundamentally altered due to the spraying on of a thin layer.

One advantageous hydrophobing material is PTFE (polytetrafluoroethylene).

It has been possible to obtain very good results when the barrier layer consisting of a carbon/PTFE mixture has a surface density in the range of between 0.3 $mg/cm^2$ and 1 $mg/cm^2$ and, in particular, in the order of magnitude of 0.6 $mg/cm^2$. In the case of gaseous diffusion electrodes produced accordingly, the efficiency of the electrode has been improved 100% in comparison with electrodes with no barrier layer or electrodes provided with a barrier layer foil.

In a variation of one embodiment, a carrier structure for carrying, in particular, a reaction layer is produced by rolling carbon powder onto the carrier. As a result, a carrier structure may be formed in an inexpensive manner, in particular, when a carrier mesh consisting of high-grade steel, silver-plated nickel or titanium is used as carrier.

In order to ensure a secure adhesion of the carbon powder on the carrier and to secure the adhesion of the carbon particles in the layer it is advantageous when the carbon powder is rolled on mixed with a binding agent. A hydrophobing material, such as PTFE, can be used as binding agent so that, at the same time, the carrier structure also has a barrier effect with respect to an electrolyte breakout.

In addition, a pore-forming agent, such as ammonium hydrogen carbonate or citric acid, can be added to the material to be rolled on in order to adjust the structure of the carrier structure accordingly in a defined manner.

It is, in particular, provided for the composition of the material to be rolled on and/or the particle size therein and/or a contact pressure during the roller application to be adjusted in order to obtain a layer which is built up in a defined manner and optimized for the special use.

In order to form an electrode assembly, for example, for use in membrane fuel cells, the carrier structure can be connected to a membrane. A function layer is favorably sprayed onto the carrier structure and/or onto the membrane prior to their connection, this function layer being, in particular, a reaction layer with a catalytically active material, such as platinum. As a result of the spraying on, this function layer may be of a thin formation in order to save, in particular, on material costs. The carrier structure possibly with a function layer sprayed onto it and the membrane possibly with a function layer sprayed onto it may then be brought together in a simple manner and connected, wherein the function layer is then located between the carrier structure and the membrane.

In a variation of one embodiment it is provided for a function layer and, in particular, a reaction layer to be sprayed onto a connecting side of the membrane and an oppositely located side of the membrane prior to the connection between carrier structure and membrane. In this way, an electrode assembly may be produced quickly and inexpensively as an electrode-membrane unit.

It may be provided for the respective spraying on to be carried out simultaneously so that the production is simplified.

The function layer is, in particular, a reaction layer with a catalytically active material.

The connection between carrier structure and membrane, wherein at least one of them is provided with a reaction layer, may be provided in a simple manner by way of roller application. If the corresponding rollers are heated, a thermal fixing of the reaction layer on the carrier structure and/or the membrane may also be achieved in addition to a thermal fixing of the connection between carrier structure and membrane.

In order to form an electrode-membrane unit, in particular, for a fuel cell it is advantageous when an additional carrier structure is connected to the carrier structure-membrane connection. As a result, a catalytically active reaction layer, which is sprayed either onto the membrane or onto the respective carrier structure, may be arranged on both sides of the membrane. The additional carrier structure is advantageously rolled on to form the electrode-membrane unit.

It is favorable when the additional carrier structure is built up essentially in the same way as the carrier structure which is first connected to the membrane. The additional carrier structure has essentially the same function as the carrier structure which is first connected to the membrane and so the electrode-membrane unit may be produced in a simple manner. It is also favorable for this purpose when the additional carrier structure is produced essentially in the same way as the carrier structure which is first connected to the membrane.

An electrode-membrane unit formed in such a way is advantageously used for a fuel cell.

In a variation of one embodiment it is provided for the first layer to be a rolled-on reaction layer. Subsequently, a barrier layer is sprayed onto this rolled-on reaction layer in order to avoid the risk of any electrolyte breakout.

It may be provided, in addition, for a contact layer to be sprayed onto the carrier insofar as this carrier is not conductive, wherein essentially the same material as for the barrier layer is used, in particular, for the contact layer.

An electrode of this type, with which the electrode is, in particular, a gaseous diffusion electrode, may be produced in a simple manner when the barrier layer and the contact layer are sprayed on at the same time.

It may also be provided for a membrane to be arranged on an outer function layer, such as a reaction layer.

An electrode assembly produced as described above may be used in an advantageous manner in conjunction with a fuel cell.

An electrode, onto which a barrier layer is sprayed, may be used in an advantageous manner as a gaseous diffusion or oxygen-consuming electrode.

Furthermore, the object of the invention is to provide an electrode which has a high electrode efficiency.

This object is accomplished in accordance with the invention, in an electrode which has a catalytically active reaction layer, in that a barrier layer produced by means of a sprayed on powder is arranged on the reaction layer.

By spraying a barrier layer, for example, onto a rolled gaseous diffusion electrode, the problem of the electrolyte breakout may be prevented. On account of a corresponding, dry powder being sprayed on, no fabric, such as, for example, a PTFE fabric which is correspondingly expensive and makes the production more difficult, need be arranged on the reaction layer. In addition, adhesion problems, in particular, during use result with the arrangement of a fabric on the gaseous diffusion electrode.

Electrode efficiencies increased by 100% have resulted due to such inventive electrodes.

In this respect, it is particularly advantageous when the barrier layer is formed by a mixture of carbon and a hydrophobing material. The hydrophobing material is, for example, PTFE.

It has proven to be advantageous when, in particular, in the case of this specific material the barrier layer has a surface density in the range of between 0.4 mg/cm$^2$ and 0.8 mg/cm$^2$ and this surface density is, in particular, 0.6 mg/cm$^2$.

Additional advantages and developments of such an inventive electrode have already been explained in conjunction with the inventive process.

Figure 2:
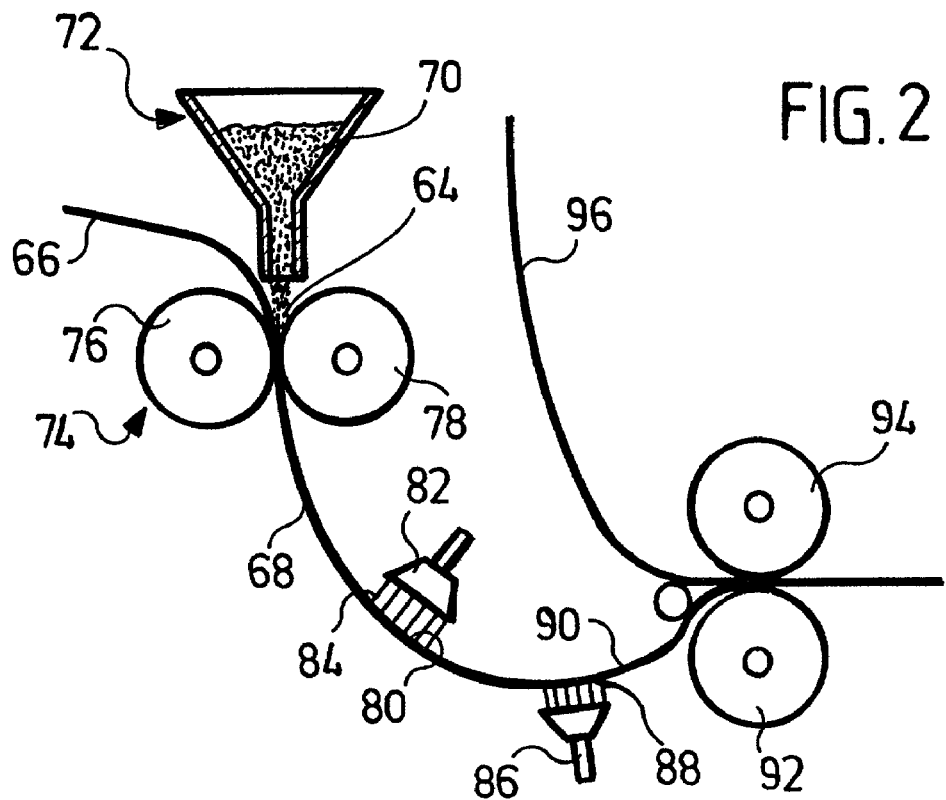
Figure 3:
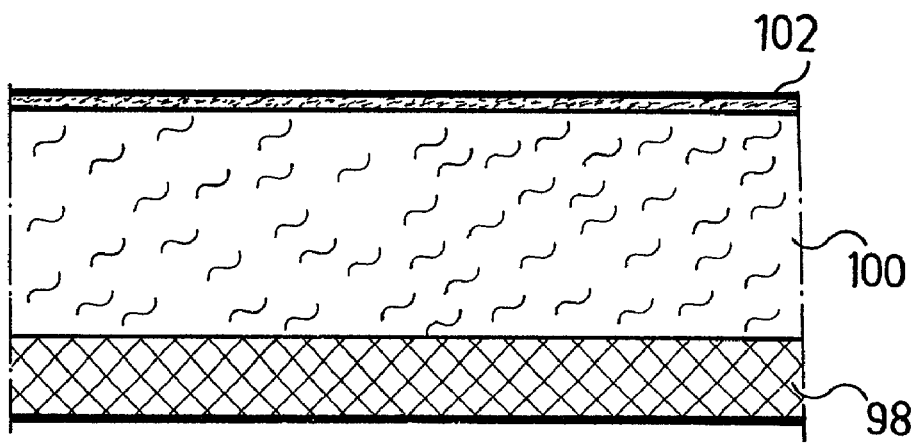

The following description of preferred embodiments serves to explain the invention in greater detail in conjunction with the drawings. These show:

FIG. 1 a schematic illustration of a first embodiment of the inventive process for the production of an electrode assembly, wherein the production of an electrode-membrane unit is shown;

FIG. 2 a schematic illustration of a second embodiment of the inventive process for the production of an electrode, with which a gaseous diffusion electrode is provided with a barrier layer, and FIG. 3 a schematic illustration of an inventive gaseous diffusion electrode with a barrier layer.

In a first embodiment of the inventive process, a mixture consisting of carbon and a binding agent, such as PTFE (polytetrafluoroethylene), is produced in a first step, for example, in a blade mill. If required, a pore-forming agent, such as, for example, ammonium hydrogen carbonate or citric acid, can be added. In this respect, the particle size, in particular, of the carbon is selectively adjusted in the blade mill so that a specific average particle size predominates in the mixture.

This mixture 8 is supplied to an application device 10 which is of a funnel-shaped design with a supply opening 12 and an application opening 14. The mixture 8 may be applied to a carrier 16 via the latter.

The carrier 16 is of a tape-like design and, in particular, is designed as a carrier mesh. For example, the carrier 16 is a high-grade steel mesh, a silver-plated nickel mesh or a titanium mesh.

The application of the mixture 8 to the carrier 16 is brought about in a calender 18 which has rollers 20, 22 turning in opposite directions with essentially parallel axes of rotation. Their directions of rotation are essentially parallel to the direction of flow of the mixture 8 in the area, in which the mixture 8 impinges on the carrier 16 from the application opening 14; the mixture 8 is rolled onto the carrier 16 via the supply which is tangential with respect to the roller rotation.

The contact pressure of the rollers 20, 22 is adjustable during the roller application, in particular, due to the fact that the distance between the axes of rotation of the two rollers 20 and 22 is adjustable and/or the rotational speed of the rollers 20, 22 is adjustable.

It may also be provided for the rollers 20, 22 to be heatable in order to effect a thermal fixing of the mixture 8 on the carrier 16.

A carrier structure 24, which is formed by the mixture 8 rolled onto the carrier 16 and the carrier 16, may be formed selectively via the composition of the mixture 8 and, in particular, via the adjustment of the content of the binding agent in the mixture and the content of the pore-forming agent, via the adjustment of the average particle size in the mixture 8 and via the adjustment of the contact pressure. This carrier structure 24 may also act in an electrolyte-repelling manner when a hydrophobing binding agent, such as PTFE, is used accordingly and the content of this hydrophobing binding agent in the mixture is correspondingly large.

The carrier structure 24 may be produced without using any carbon fabric or carbon fleece and so the process can be carried out inexpensively.

In a further step, the carrier structure 24 is connected to a proton-conducting membrane 26.

A reaction layer, which is catalytically active, is arranged between the proton-conducting membrane 26 and the carrier structure 24. This reaction layer is sprayed on prior to the connection.

In FIG. 1, a variation of one embodiment is shown, with which by means of a spray nozzle 28 the reaction layer points towards the connecting side 30 of the membrane 26 to the carrier structure 24. It may, however, also be provided for the reaction layer to be sprayed onto the carrier structure 24.

A dry powder is sprayed onto the membrane 26 by means of the spray nozzle 28 in order to form a thin reaction layer. The powder may, for example, be a platinum carrier material on a carbon basis with platinum as catalytically active material.

It may, in addition, be provided for an additional reaction layer to be applied to the side 32 of the membrane 26 located opposite the connecting side 30, in particular, simultaneously with the application of the reaction layer to the connecting side 30 of the membrane 26. For this purpose, a nozzle 34 is, for example, provided. In FIG. 1, a variation is shown, with which the streams of powder of the two spray nozzles 28 and 34 are directed towards one another and the membrane 26 is guided through these streams of powder in order to form reaction layers simultaneously on the two sides 30 and 32 of the membrane 26.

The connection between the carrier structure 24 and the membrane 26 provided with the reaction layers is brought about in a calender 36 with rollers 38, 40 turning in opposite directions. The rollers 38 and 40 are, in particular, heated in order to provide for a thermal fixing of the reaction layers on the membrane and also a thermal fixing of the reaction layer on the connecting side 30 to the carrier structure 24.

A carrier structure-membrane connection 42 then exits from the calender 36. This is provided with an additional carrier structure 44 which is, in principle, built up in the same way as the carrier structure 24, wherein the side 46 of the carrier structure 44 with rolled on material facing the carrier structure-membrane connection 42 is arranged on this carrier structure-membrane connection so that a carrier side 48 of the carrier structure 44 faces away from the carrier structure-membrane connection 42.

In order to produce the carrier structure 44, a carrier 50 is, as described on the basis of the production of the carrier structure 24, guided through a calender 52, wherein a mixture 54 which is, in particular, of the same composition as the mixture 8 is supplied to the calender 52 via an application device 56.

It is, in particular, provided for the same conditions to essentially prevail during the application of the mixture 54 as during the application of the mixture 8 to the carrier 16 in order to obtain the same formation of the carrier structures 24 and 44.

The carrier structure 24 is then rolled onto the carrier structure-membrane connection by means of rollers 58, 60 turning in opposite directions. As a result, an electrode-membrane unit is obtained which can be used, for example, in a fuel cell (PEFC—Proton Exchange Membrane Fuel Cells).

In a second embodiment of the inventive process, as illustrated schematically in FIG. 2, a gaseous diffusion electrode (GDE) 68 is produced by rolling a reaction layer 64 onto a carrier 66.

A catalytic powder 70 consisting of a mixture of an electric material, e.g., carbon, a catalyst material, e.g., platinum and additional additives serves for the production of the reaction layer 64. These ingredients are mixed with one another in a blade mill to form the powder 70 (not shown in FIG. 2).

The powder 70 is supplied via a funnel-shaped application device 72, in particular, by means of the effect of gravity to a calender 74 with a pair of rollers 76, 78 turning in opposite directions and here the reaction layer 64 is rolled on in a predetermined thickness. This process and an example of the composition of the powder 70 are described in DE 195 09 749 A1, to which reference is expressly made.

On the gaseous diffusion electrode 68 thus produced, a barrier layer 80 is sprayed onto the reaction layer 64 as function layer. For this purpose, one or more spray nozzles 82 are provided for the dry spraying on of a powder material for forming a thin barrier layer.

When electrodes are used, in particular, in electrolytic cells with liquid electrolytes, such as, for example, in alkaline fuel cells, chlorine-alkali electrolytic cells or HCl electrolytic cells, there is, in principle, the problem that the electrolyte can break out. The barrier layer 80 prevents any such breakout. For this purpose, a hydrophobing material, such as, for example, PTFE, is mixed into the powder 84 to be sprayed on. The carrier material of the powder 84 is an electrically conductive material and, in particular, carbon.

The powder 84 is applied to the gaseous diffusion electrode 68 with a surface density which is, for example, in the order of magnitude of 0.6 mg/cm$^2$. As a result of the application of such a barrier layer, electrode efficiencies have been increased by 100% in comparison with a gaseous diffusion electrode produced in the same way but without any barrier layer.

The carrier 66 is designed, in particular, as a carrier tape or carrier mesh. A carrier mesh is produced, for example, from high-grade steel, silver-plated nickel or titanium. In the case where the carrier mesh 66 is not conductive, a contact layer 88 is sprayed onto the side of the gaseous diffusion electrode 68 facing away from the reaction layer 64 by means of one or more spray nozzles 86, this contact layer being produced, in particular, from a mixture corresponding to the powder 84, i.e., is produced from a carbon-PTFE mixture. As a result, the contact layer 88 also acts at the same time as a barrier layer.

The spray nozzles 82 and 86 may be arranged so as to be spatially offset relative to one another such that the reaction layer 84 is first sprayed on and then, subsequently, the contact layer 88 on the opposite side of the rolled-on gaseous diffusion electrodes 68. It may, however, also be provided for the two layers 84 and 88 to be sprayed on at the same time, for example, in that the two spray nozzles 82 and 86 are arranged so as to be located opposite one another.

The gaseous diffusion electrode 90 with a sprayed-on barrier layer is supplied to a pair of rollers 92, 94 turning in opposite directions, wherein the rollers are, in particular, heated in order to take care of a thermal fixing of the barrier layer 80 (and, where applicable, the contact layer 88) on the gaseous diffusion electrode.

In a further step, it may be provided, in order to produce an assembly consisting of the gaseous diffusion electrode 90 and a solid electrolyte, for example, for a fuel cell, for a membrane 96 to be supplied in the pair of rollers 92, 94 and there be rolled onto the gaseous diffusion electrode 90, namely onto its barrier layer 80. The production of such an assembly is described in DE 195 09 749 A1, to which reference is expressly made.

A first layer is rolled on by means of the inventive production process. In the first embodiment, the carrier structure 24 is thereby formed and in the second embodiment the gaseous diffusion electrode with the reaction layer 64 as first layer. Subsequently, an electrode assembly or an electrode with at least one additional, sprayed on function layer is provided. As a result of the inventive combination of roller application and spraying on of layers, a separation of the functions of the layers can take place, wherein the function of the layer itself is taken into consideration in the application process.

No semifinished products need then be used, such as backings, barrier foils, second electrodes or the like. These semifinished products are, in part, very expensive (such as carbon fabrics or carbon fleeces or also PTFE fabrics).

As a result of the inventive process, a multi-layer electrode or multi-layer electrode assembly may be produced, with which the individual layers may be optimized in their functioning by means of the production process.

In the case of an inventive gaseous diffusion electrode which is shown in FIG. 3 and which is produced, in particular, with a process in accordance with the embodiment according to FIG. 2, a reaction layer 100 is arranged on a carrier 98, for example, a high-grade steel mesh, a silver-plated nickel mesh or titanium mesh, and this reaction layer has, for example, been rolled on. The reaction layer is produced from a mixture of an electrically conductive material, e.g., carbon, a catalyst material, e.g., platinum, and possible additional additives.

A thin barrier layer 102 is arranged on the reaction layer 100 and this has been sprayed on. This barrier layer serves to prevent any electrolyte breakout during the use of the electrode in an electrolytic cell. The material of the barrier layer 102 does not participate in the electrochemical reactions at the electrode. A hydrophobing material, such as PTFE, is added to the material sprayed on by means of a powder to form the barrier layer 102 in order to achieve this barrier effect. In order to ensure the conductivity, the sprayed-on powder is a mixture of an electrically conductive material, e.g., carbon and this hydrophobing material. The surface density of the barrier layer is in the range between approximately 0.3 mg/cm$^2$ and 1 mg/cm$^2$ and is, in particular, approximately 0.6 mg/cm$^2$.

As a result of an electrode produced in such a manner, electrode efficiencies improved by 100% in comparison with an electrode not provided with a sprayed-on barrier layer have been obtained.

The invention claimed is:

1. Process for the production of a multi-layer electrode or electrode assembly, wherein:
   a first layer is rolled onto a carrier;
   at least one additional layer is produced by spraying on a powder in a dry manner after said first layer is rolled onto the carrier; and
   said at least one additional layer is a function layer;
   wherein:
   the first layer is a rolled-on reaction layer;
   said carrier is an electrically non-conductive carrier; and
   a contact layer is sprayed onto said electrically non-conductive carrier on a side of the carrier opposite that of the rolled-on reaction layer.

2. Process as defined in claim 1, wherein the first layer is rolled onto the carrier by means of one or more heated rollers.

3. Process as defined in claim 1, wherein the carrier is designed as a carrier mesh.

4. Process as defined in claim 1, wherein a sprayed-on function layer is a barrier layer.

5. Process as defined in claim 4, wherein a mixture of carbon and a hydrophobing material is used for forming a barrier layer.

6. Process as defined in claim 5, wherein PTFE is used as hydrophobing material.

7. Process as defined in claim 4, wherein the barrier layer has a surface density in the range of between 0.3 mg/cm$^2$ and 1 mg/cm$^2$.

8. Process as defined in claim 1, wherein a barrier layer is sprayed onto the rolled-on reaction layer.

9. Process as defined in claim 1, wherein:
   the contact layer comprises a barrier layer.

10. Process as defined in claim 1, wherein:
    the function layer comprises a barrier layer; and
    the barrier layer and the contact layer are sprayed onto opposite sides of the carrier at the same time.

11. Process as defined in claim 1, wherein a membrane is arranged on an outer function layer.

* * * * *